(12) United States Patent
Larson

(10) Patent No.: US 10,006,644 B2
(45) Date of Patent: Jun. 26, 2018

(54) METHOD AND APPARATUS FOR POSITIONING HEATING ELEMENTS

(71) Applicant: PROGRESS PROFILES SPA, Asolo (TV) (IT)

(72) Inventor: David D. Larson, Golden, CO (US)

(73) Assignee: Progress Profiles SpA (IT)

( * ) Notice: Subject to any disclaimer, the term of this patent is extended or adjusted under 35 U.S.C. 154(b) by 0 days. days.

(21) Appl. No.: 15/260,859

(22) Filed: Sep. 9, 2016

(65) Prior Publication Data
US 2016/0377300 A1    Dec. 29, 2016

Related U.S. Application Data

(63) Continuation of application No. 14/860,065, filed on Sep. 21, 2015, now Pat. No. 9,518,746, which is a continuation of application No. 12/550,111, filed on Aug. 28, 2009, now Pat. No. 9,188,348.

(51) Int. Cl.
| | |
|---|---|
| *F24D 13/02* | (2006.01) |
| *F24D 3/14* | (2006.01) |
| *E04B 5/48* | (2006.01) |
| *F16L 3/02* | (2006.01) |
| *E04F 15/18* | (2006.01) |
| *F24D 3/12* | (2006.01) |

(52) U.S. Cl.
CPC ............. *F24D 13/024* (2013.01); *E04B 5/48* (2013.01); *E04F 15/182* (2013.01); *E04F 15/185* (2013.01); *F16L 3/02* (2013.01); *F24D 3/141* (2013.01); *F24D 3/144* (2013.01); *E04F 2290/023* (2013.01); *Y02B 30/26* (2013.01)

(58) Field of Classification Search
CPC ........ F24D 13/024; F24D 3/144; F24D 3/141; F24D 3/12; F24D 19/0213; F24D 13/02; Y02B 30/26; E04B 5/48; H05B 3/28; E04F 15/18

USPC ..... 52/220.1; 138/177; 165/49, 50, 47, 48.1, 165/53, 56; 219/213; 432/31
IPC .............................. F24D 3/14,3/12, 3/02, 3/16
See application file for complete search history.

(56) References Cited

U.S. PATENT DOCUMENTS

| | | | |
|---|---|---|---|
| 254,269 A | 2/1882 | Brown | |
| 1,485,370 A * | 3/1924 | Cumfer .................. | E04F 13/04 |
| | | | 52/446 |
| 1,549,773 A | 8/1925 | Hynes | |
| 1,809,620 A | 6/1931 | Cole | |

(Continued)

FOREIGN PATENT DOCUMENTS

| | | |
|---|---|---|
| CA | 1186470 | 5/1985 |
| CH | 657690 | 9/1986 |

(Continued)

OTHER PUBLICATIONS

"DE_9114591_U1_M—Machine Translation.pdf", Machine translation, EPO.org, May 1, 2017.*

(Continued)

*Primary Examiner* — Gregory Huson
*Assistant Examiner* — Daniel E Namay
(74) *Attorney, Agent, or Firm* — Sheridan Ross P.C.

(57) ABSTRACT

An underlayment system is provided that includes a plurality of bosses that emanate form a common base member. The bosses and bases preferably include an opening therethrough that will allow for subsequent layers of adhesive to interact and bond to each other. The bosses are also spaced in such a way to help secure a wire snugly therebetween.

20 Claims, 8 Drawing Sheets

(56) References Cited

U.S. PATENT DOCUMENTS

| | | |
|---|---|---|
| 1,961,374 A | 6/1934 | Mazer |
| 2,139,512 A | 12/1938 | Nagorny |
| 2,325,303 A | 7/1943 | Brooke |
| 2,502,642 A | 4/1950 | Currlin |
| 2,928,445 A | 3/1960 | Van Buren, Jr. |
| 2,956,785 A * | 10/1960 | Richl .................. F24D 5/10 165/56 |
| 3,135,040 A | 6/1964 | Watson |
| 3,235,712 A | 2/1966 | Watson |
| 3,288,998 A | 11/1966 | Press, Jr. |
| 3,419,457 A | 12/1968 | Bleasdale |
| 3,434,401 A | 3/1969 | Kiewit |
| 3,487,579 A | 1/1970 | Brettingen |
| 3,495,367 A | 2/1970 | Kobayashi |
| 3,597,891 A | 8/1971 | Martin |
| 3,695,615 A | 10/1972 | Shoptaugh |
| 3,757,481 A | 9/1973 | Skinner |
| 3,854,372 A | 12/1974 | Gutshall |
| 4,016,692 A | 4/1977 | Jordan et al. |
| 4,183,167 A | 1/1980 | Jatich |
| 4,250,674 A | 2/1981 | Feist |
| 4,326,366 A | 4/1982 | Werner |
| 4,338,994 A | 7/1982 | Hewing et al. |
| 4,576,221 A | 3/1986 | Fennesz |
| 4,640,067 A | 2/1987 | Hagemann et al. |
| 4,640,854 A | 2/1987 | Radtke |
| 4,889,758 A | 12/1989 | Rinkewich |
| 4,923,733 A | 5/1990 | Herbst |
| 4,955,471 A | 9/1990 | Hirose et al. |
| 4,993,202 A | 2/1991 | Thiel |
| 4,995,471 A | 2/1991 | Hara et al. |
| 4,997,308 A | 3/1991 | Welling, Jr. |
| 5,042,569 A | 8/1991 | Siegmund |
| 5,052,161 A | 10/1991 | Whitacre |
| 5,078,203 A | 1/1992 | Shiroki |
| D325,428 S | 4/1992 | Vitsur |
| 5,105,595 A | 4/1992 | Tokei et al. |
| 5,131,458 A | 7/1992 | Bourne et al. |
| 5,374,466 A | 12/1994 | Bleasdale |
| 5,381,709 A | 1/1995 | Louw |
| 5,386,670 A | 2/1995 | Takeda et al. |
| 5,443,332 A | 8/1995 | Hollis |
| 5,447,433 A | 9/1995 | Perry, Jr. |
| 5,480,259 A | 1/1996 | Thrower |
| 5,499,476 A | 3/1996 | Adams et al. |
| D372,158 S | 7/1996 | Bonaddio et al. |
| D370,034 S | 8/1996 | Kipfer |
| 5,585,154 A | 12/1996 | Rhoades |
| 5,789,462 A | 8/1998 | Motani et al. |
| 5,863,440 A | 1/1999 | Rink et al. |
| 6,076,315 A | 6/2000 | Kondo |
| 6,094,878 A | 8/2000 | Schluter |
| 6,178,662 B1 | 1/2001 | Legatzke |
| 6,279,427 B1 | 8/2001 | Francis |
| 6,434,901 B1 | 8/2002 | Schluter |
| 6,805,298 B1 | 10/2004 | Corbett |
| 6,918,217 B2 | 7/2005 | Jakob-Bamberg et al. |
| D508,332 S | 8/2005 | Julton |
| 7,118,138 B1 | 10/2006 | Rowley et al. |
| D541,396 S * | 4/2007 | Fawcett .................. D23/314 |
| 7,250,570 B1 | 7/2007 | Morand et al. |
| D551,152 S | 9/2007 | Funk et al. |
| D568,006 S | 4/2008 | Shin |
| D587,358 S * | 2/2009 | Stephan .................. D23/314 |
| 7,585,556 B2 | 9/2009 | Julton |
| 7,669,371 B2 | 3/2010 | Hill |
| 7,880,121 B2 | 2/2011 | Naylor |
| D636,098 S | 4/2011 | Reynolds et al. |
| 8,002,241 B1 | 8/2011 | Shaw |
| D659,529 S | 5/2012 | Ojanen et al. |
| 8,176,694 B2 | 5/2012 | Batori |
| 8,220,221 B2 | 7/2012 | Gray |
| 8,288,689 B1 | 10/2012 | Adelman |
| 8,341,911 B2 | 1/2013 | Collison et al. |
| 8,414,996 B2 | 4/2013 | Senior |
| 8,517,473 B2 | 8/2013 | Monyak et al. |
| 8,573,901 B2 | 11/2013 | de Souza Filho et al. |
| D709,368 S | 7/2014 | van de Klippe et al. |
| D709,369 S | 7/2014 | van de Klippe et al. |
| 8,950,141 B2 | 2/2015 | Schluter et al. |
| D733,558 S | 7/2015 | Wyne |
| 9,188,348 B2 | 11/2015 | Smolka et al. |
| D747,502 S | 1/2016 | Reynolds et al. |
| 9,228,749 B2 | 1/2016 | Morand et al. |
| 9,416,979 B2 | 8/2016 | Larson |
| 9,482,262 B2 | 11/2016 | Richards |
| D773,697 S | 12/2016 | Amend |
| 9,518,746 B2 * | 12/2016 | Larson .................. F24D 13/024 |
| 9,625,163 B2 * | 4/2017 | Larson .................. F24D 13/02 |
| 2002/0109291 A1 | 8/2002 | Lawrence |
| 2003/0024190 A1 | 2/2003 | Stanchfield |
| 2005/0184066 A1 | 8/2005 | Brooks et al. |
| 2006/0260233 A1 | 11/2006 | Schluter |
| 2006/0265975 A1 * | 11/2006 | Geffe .................. E04F 15/10 52/177 |
| 2006/0278172 A1 | 12/2006 | Ragonetti et al. |
| 2007/0039268 A1 | 2/2007 | Ambrose, Jr. et al. |
| 2007/0056233 A1 | 3/2007 | Kang et al. |
| 2008/0017725 A1 | 1/2008 | Backman, Jr. |
| 2008/0173060 A1 * | 7/2008 | Cymbalisty .......... B01F 5/0646 72/369 |
| 2008/0276557 A1 * | 11/2008 | Rapaz .................. E04B 5/026 52/302.3 |
| 2008/0290503 A1 * | 11/2008 | Karavakis .......... H01L 23/3737 257/713 |
| 2008/0290504 A1 * | 11/2008 | Karavakis .......... H01L 23/3737 257/713 |
| 2008/0295441 A1 | 12/2008 | Carolan et al. |
| 2009/0026192 A1 * | 1/2009 | Fuhrman .................. H05B 3/06 219/523 |
| 2009/0230113 A1 * | 9/2009 | Batori .................. F24D 3/142 219/213 |
| 2010/0048752 A1 | 2/2010 | Vignola et al. |
| 2011/0047907 A1 * | 3/2011 | Smolka .................. F24D 13/024 52/220.1 |
| 2014/0069039 A1 * | 3/2014 | Schluter .................. E04F 15/182 52/390 |
| 2016/0010327 A1 * | 1/2016 | Larson .................. F24D 13/024 52/220.1 |
| 2016/0033144 A1 * | 2/2016 | Larson .................. F24D 13/024 248/49 |
| 2016/0047131 A1 | 2/2016 | Larson |
| 2017/0073980 A1 | 3/2017 | Szonok |
| 2017/0175389 A1 | 6/2017 | Liang et al. |

FOREIGN PATENT DOCUMENTS

| | | |
|---|---|---|
| DE | 2840149 | 3/1980 |
| DE | 8413516 | 10/1984 |
| DE | 3317131 | 11/1984 |
| DE | 3730144 | 4/1988 |
| DE | 4201553 | 11/1992 |
| DE | 9114591 | 3/1993 |
| DE | 4230168 | 8/1993 |
| DE | 4226312 | 2/1994 |
| DE | 4242026 | 6/1994 |
| DE | 29609497 | 8/1996 |
| DE | 19750277 | 5/1999 |
| DE | 19828607 | 12/1999 |
| DE | 19936801 | 8/2000 |
| DE | 19912922 | 1/2001 |
| DE | 10040643 | 11/2001 |
| DE | 202006013453 | 11/2006 |
| DE | 102006004626 | 8/2007 |
| DE | 102006004755 | 8/2007 |
| EM | 001079214-0005 | 3/2009 |
| EP | 60547 | 9/1982 |
| EP | 74490 | 3/1983 |
| EP | 133556 | 2/1985 |
| EP | 189020 | 7/1986 |
| EP | 367176 | 5/1990 |
| EP | 368804 | 5/1990 |
| EP | 437999 | 7/1991 |

(56) References Cited

FOREIGN PATENT DOCUMENTS

| | | | | |
|---|---|---|---|---|
| EP | 514684 | 11/1992 | | |
| EP | 0582031 | 2/1994 | | |
| EP | 0811808 | 12/1997 | | |
| EP | 947778 | 10/1999 | | |
| EP | 1054217 | 11/2000 | | |
| EP | 1068413 | 1/2001 | | |
| EP | 1074793 | 2/2001 | | |
| EP | 1096079 | 5/2001 | | |
| EP | 1338413 | 8/2003 | | |
| EP | 1063478 | 10/2003 | | |
| EP | 1208332 | 3/2004 | | |
| EP | 1770337 | 4/2007 | | |
| FR | 2695986 | 3/1994 | | |
| FR | 2746426 | 9/1997 | | |
| GB | 2006548 | 5/1979 | | |
| GB | 2097836 | 11/1982 | | |
| GB | 2364565 | 1/2002 | | |
| GB | 2373042 | 9/2002 | | |
| JP | H01-139935 | 6/1989 | | |
| JP | H05-264051 | 10/1993 | | |
| JP | 2008-025295 | 2/2008 | | |
| WO | WO 82/03099 | 9/1982 | | |
| WO | WO 95/22671 | 8/1995 | | |
| WO | WO 9955985 A1 | * | 11/1999 | ......... B29C 37/0082 |
| WO | WO 0113044 A1 | * | 2/2001 | ............. F24D 3/142 |
| WO | WO 2004/111544 | 12/2004 | | |

OTHER PUBLICATIONS

"Wall Skimmer Octagonal Nut (on-line)," National Pool Wholesalers, dated Aug. 12, 2012, 1 page [retrieved from internet Nov. 18, 2016, URL: https://web.archive.org/web/20120812084211/http://www.nationalpoolwholesalers.com/_Wall_SkimmerOctagonal_Nut_--SKU_PWSP17BUW.html].
Official Action for U.S. Appl. No. 29/493,206, dated Dec. 2, 2016 9 pages.
Official Action for U.S. Appl. No. 29/493,206, dated May 18, 2017 6 pages.
Official Action for U.S. Appl. No. 29/547,874, dated Nov. 18, 2016 9 pages.
Notice of Allowance for U.S. Appl. No. 29/547,874, dated May 19, 2017 7 pages.
U.S. Appl. No. 29/493,206, filed Jun. 6, 2014, Larson.
U.S. Appl. No. 29/547,874, filed Dec. 8, 2015, Larson.
U.S. Appl. No. 15/070,960, filed Mar. 15, 2016, Bordin et al.
U.S. Appl. No. 15/185,576, filed Jun. 17, 2016, Bordin.
U.S. Appl. No. 29/573,009, filed Aug. 2, 2016, Bordin.
U.S. Appl. No. 15/260,848, filed Sep. 9, 2016, Larson.
"5 Facts You May Not Know About Heated Flooring," southcypress.com, Sep. 12, 2015, 4 pages [retrieved Aug. 3, 2016 from: https://web.archive.org/web/20150912220312/http://www.southcypress.com/v3/articles/heated-flooring.htm].
"Ditra Heat," GlensFalls Tile & Supplies, Sep. 4, 2014, 1 page [retrieved Aug. 3, 2016 from: http://www.glensfallstile.com/general-tips/ditra-heat/772/].
"Illustrated price list BT 7," Schlüter-Systems KG, Dec. 7, 28 pages.
Schluter Systems, Profile of Innovation, Illustrated Price List, Jan. 1, 2008, 2 pages.
International Search Report and Written Opinion for International (PCT) Patent Application No. PCT/US2015/045688, dated Nov. 12, 2015 9 pages.
Official Action for U.S. Appl. No. 12/550,111, dated Apr. 26, 2013 12 pages.
Official Action for U.S. Appl. No. 12/550,111, dated Dec. 5, 2013 14 pages.
Official Action for U.S. Appl. No. 12/550,111, dated Jan. 23, 2015 16 pages.
Notice of Allowance for U.S. Appl. No. 12/550,111, dated Aug. 28, 2015 11 pages.
Notice of Allowance for U.S. Appl. No. 12/550,111, dated Sep. 22, 2015 10 pages.
Official Action for U.S. Appl. No. 29/493,206, dated Nov. 19, 2015 4 pages Restriction Requirement.
Official Action for U.S. Appl. No. 29/493,206, dated Aug. 10, 2016 8 pages.
Official Action for U.S. Appl. No. 29/547,874, dated Aug. 10, 2016 8 pages.
Official Action for U.S. Appl. No. 14/860,065, dated Mar. 15, 2016, 6 pages.
Third Party Submission for U.S. Appl. No. 14/860,065, dated Apr. 28, 2016, 18 pages.
Notice of Allowance for U.S. Appl. No. 14/880,859, dated Mar. 7, 2016, 16 pages.
Official Action for U.S. Appl. No. 14/829,108, dated Jan. 20, 2016, 10 pages.
Third Party Submission for U.S. Appl. No. 14/829,108, dated Aug. 17, 2016, 17 pages.
Official Action for U.S. Appl. No. 14/829,108, dated Aug. 18, 2016 5 pages Restriction Requirement.
Official Action for U.S. Appl. No. 15/070,960, dated Aug. 26, 2016 9 pages.
Official Action for U.S. Appl. No. 15/185,576, dated Aug. 24, 2016 14 pages.
Official Action for U.S. Appl. No. 14/523,557, dated Nov. 24, 2015, 11 pages.
Official Action for U.S. Appl. No. 14/523,557, dated Mar. 26, 2015, 14 pages.
Polypipe Brochure; "Redefining Heating Systems," www.ufch.com; Polyplumb: Hot & Cold Plumbing & Heating System; © 2006, Polypipe Group; Printed: Feb. 2007, 44 pages.
Third Party Submission for U.S. Appl. No. 14/860,065, filed Jun. 23, 2016 25 pages.
Third Party Submission for U.S. Appl. No. 14/860,065, filed Jul. 8, 2016 26 pages.
Notice of Allowance for U.S. Appl. No. 14/860,065, dated Sep. 14, 2016 10 pages.
U.S. Appl. No. 15/504,188, filed Feb. 15, 2017, Larson.
U.S. Appl. No. 15/648,152, filed Jul. 12, 2017, Larson.
U.S. Appl. No. 15/647,510, filed Jul. 12, 2017, Bordin.
Official Action for U.S. Appl. No. 29/493,206, dated Jul. 25, 2017 7 pages.
Notice of Allowance for U.S. Appl. No. 29/493,206, dated Nov. 8, 2017 5 pages.

* cited by examiner

METHOD AND APPARATUS FOR POSITIONING HEATING ELEMENTS

CROSS-REFERENCE TO RELATED APPLICATIONS

This application is a continuation of U.S. patent application Ser. No. 14/860,065, filed Sep. 21, 2015, which is a continuation of U.S. patent application Ser. No. 12/550,111, filed Aug. 28, 2009 and now patented as U.S. Pat. No. 9,188,348, the entire disclosure of which is hereby incorporated herein by reference.

FIELD OF THE INVENTION

Embodiments of the present invention are generally related to underlayments associated with radiant floor or wall heating systems. More specifically, one embodiment of the present invention includes a plurality of protrusions that are adapted to locate and firmly secure wires or pipes associated with a radiant heating system.

BACKGROUND OF THE INVENTION

In-floor and in-wall heating and cooling is well known that utilizes heat conduction and radiant heat, for example, for indoor climate control rather than forced air heating that relies on convection. The heat is usually generated by a series of pipes that circulate heated water or by electric cable, mesh or film that provide heat when a current is applied thereto. In-floor radiant heating technology is used commonly in homes and businesses today.

Electrical floor heating systems have very low installation costs and are well suited for kitchens, bathrooms or in rooms that require additional heat, such as basements. One advantage of electric floor heating is the height of installation. For example, floor buildup can be as little as about one millimeter as the electric cables are usually associated with a specialized installation board or directly onto the sub floor. Electric underfloor heating is also installed very quickly, usually taking a half a day to a day depending on the size of the area to be heated. In addition, warm up times are generally decreased because the cables are installed approximate to the finished flooring, i.e. tile, wherein direct connection is made with the heat source rather than a stored water heater as in fluid-based systems. Electric systems are offered in several different forms, such as those that utilize a long continuous length cable or those that employ a mat with embedded heating elements. In order to maximize heat transfer, a bronze screen or carbon film heating element may be also used. Carbon film systems are normally installed under the wire and onto a thin insulation underlay to reduce thermal loss to the sub floor. Vinyls, carpets and other soft floor finishes can be heated using carbon film elements or bronze screen elements.

Another type of in-floor heating system is based on the circulation of hot water, i.e., a "hydronic" system. In a hydronic system, warm water is circulated through pipes or tubes that are incorporated into the floor and generally uses pipes from about $11/16$ inch to 1 inch to circulate hot water from which the heat emanates. The size of tubes generally translates into a thicker floor, which may be undesirable. One other disadvantage of a hydronic system is that a hot water storage tank must be maintained at all times, which is less efficient than an electric floor heating system.

In order to facilitate even heating of a floor, the wires must preferably be spaced at specific locations. One such system is disclosed in U.S. Patent Application Publication No. 2009/0026192 to Fuhrman ("Fuhrman"), which is incorporated by reference in its entirety herein. Fuhrman discloses a mat with a plurality of studs extending therefrom that help dictate the location of the wires. The mat with associated studs is placed over a sub floor with a layer of adhesive therebetween. Another layer of adhesive is placed above of the studs. The studs also guide the finishers to form a correct floor thickness. The studs thus provide a location for interweaving the wire or wires that are used in the heating system. The wire of Fuhrman, however, is not secured between adjacent studs and still may separate therefrom, which may cause uneven heating or wire damage. Furthermore, Fuhrman discloses a continuous mat wherein subsequent layers of adhesive are not able to interact with those previously placed.

Thus it is a long felt need in the field of flooring to provide a system that allows for the location and securement of various wires associated with an in floor heating system that also facilitates the creation of a sturdy floor. The following disclosure describes an improved underlayment that is adapted for securing a plurality of wires or water tubes, which also provides the mechanism for allowing successive layers of adhesive to interact with each other to form a more cohesive flooring system.

SUMMARY OF THE INVENTION

It is one aspect of the present invention to provide a system for securing a plurality of wires or tubes associated with an in floor heating system (hereinafter "heating element"). More specifically, one embodiment of the present invention is a system comprised of a base member with a plurality of bosses emanating therefrom. The bosses are spaced in such a way to firmly secure at least one heating element therebetween. Some embodiments of the present invention also employ ring shaped bosses, which will be described in further detail below. Again, the bosses are preferably positioned in such a way to firmly secure heating elements, thereby protecting the wire and maintaining a preferred location thereof. In one embodiment of the present invention the lower layer of the base is applied with heat reflective thin foil layer that directs heat toward the finished floor as opposed to the subfloor. The underlayment layer of one embodiment of the present invention is made by vacuum forming, thermal forming, injection molded, blow molded, cast or any other similar forming technique.

It is another aspect of the present invention to provide an underlayment layer that facilitates bonding of successive flooring layers. More specifically, the base of one embodiment of the present invention includes at least one opening that allows adhesive applied above and below the underlayment layer to communicate. "Adhesive" as used herein shall mean thin set, mortar, grout, self-leveling underlayment, etc. Adhesives are used to firmly associate the underlayment layer with a subfloor, wherein a layer of adhesive is initially applied to the subfloor with the underlayment layer placed thereon. Some embodiments of the present invention include a base with a roughened contact surface or that is associated with a wire or plastic mesh material to help facilitate the bond between the underlayment layer and the layer of adhesive. Next, the plurality of heating elements are associated with the bosses of the underlayment layer. Once the predetermined wire configuration is achieved, a second adhesive layer is placed atop of the underlayment layer and associated wires, which fills the spaces between adjacent bosses. Grout or other adhesives are then placed atop of the second layer of adhesive that is adapted to receive tiles, wood flooring etc. In one embodiment of the present invention, the base includes at least one opening therethrough to allow the first layer of adhesive to interact with the second layer of adhesive, thus providing a continuous adhesion path through the thickness of the underlayment layer.

The opening (and holes described below) may also allow water to flow through the underlayment layer. More specifically, often in-floor heating systems are used in outdoor environments. The openings in the bosses and the base may thus be used to allow water flow from the floor through the subfloor to a catch basin or a drainage system. The openings also allow for air to percolate through the floor during fabrication, which helps some types of adhesive cure.

In a related aspect of the present invention, embodiments employ a boss having an opening therethrough. That is, some bosses of the present invention are ring shaped having an inner diameter and an outer diameter. The inner diameter may also be associated with an opening in the base such that the second layer of adhesive may be located within the boss to communicate with the first layer of adhesive which also creates an enhanced bond between the first layer of adhesive and the second layer of adhesive. Bosses of some embodiments of the present invention are also at least partially hollow with a plurality of holes associated with an upper surface thereof. The hollow bosses decrease the weight of the underlayment layer which facilitates placement of the same. In addition, material savings are appreciated by using hollow bosses. Hollow bosses may in one embodiment receive a first layer of adhesive such that the second layer of adhesive communicates with the first layer of adhesive through the plurality of holes. Other embodiments of the present invention omit such holes and provide an airtight or at least semi airtight volume of air that is heated by the heating elements to help regulate the heat being emanated by the floor.

It is another aspect of the present invention to provide spacing between adjacent bosses that is uniquely suited to the diameter or shape of the heating element to help firmly secure the same. In addition, some embodiments of the present invention employ bosses that are non rigid and somewhat compliant that flex to receive the heating element. This interference or frictional fit between heating element and boss helps secure and protect the heating elements.

It is another aspect of the present invention to provide an underlayment layer with at least one boss that helps facilitate the remaining construction of the floor. More specifically, some embodiments of the present invention include bosses with upwardly projecting protrusions that act as guides to help the finisher ascertain the amount of adhesive or grout needed to bring the floor up to a predetermined grade. It is contemplated that such protrusions be used to place grout atop the bosses wherein top surfaces of the protrusions remain uncovered by the grout to define the finished grade. This will allow the finisher to be confident that the grout is at the desired level without having to make many measurements.

It is another aspect of the present invention to provide bosses having an outwardly protruding lip. More specifically, in one embodiment, the upper portion of the boss side surface, which will be shown in greater detail below, may be comprised of a continuous surface or at least one tab that ultimately is positioned in the space between adjacent bosses. Preferably, the tab is resiliently deflectable such that the heating element may be placed between adjacent bosses by flexing the same. Thereafter, the surface or tab will help maintain the position of the heating element between two adjacent bosses.

It is one aspect of the present invention to provide an underlayment that is adapted to receive and secure at least one heating element of a radiant heating assembly, comprising: a first base having an outer diameter and an inner diameter; a first boss having an outer diameter and an inner diameter extending from the first base, the first boss having a first outer surface; a second base having an outer diameter and an inner diameter; a second boss having an outer diameter and an inner diameter extending from the second base, the second boss having a second outer surface; and wherein the first outer surface and the second surface are spaced a predetermined distance to frictionally secure the at least one heating element.

It is another aspect of the present invention to provide an underlayment layer having a base with a plurality of bosses extending therefrom, wherein at least one boss of the plurality thereof includes an opening therethrough and wherein the base includes at least one opening between the plurality of bosses; and a heating member positioned between bosses of the plurality thereof wherein the bosses firmly secure the heating member.

It is yet another aspect of the present invention to provide a method of installing a floor, comprising: providing a sub-floor; providing an underlayment layer having a base with a plurality of bosses therefrom, wherein at least one boss of the plurality thereof includes an opening therethrough and wherein the base includes at least one opening between the plurality of bosses; bonding the underlayment layer to the subfloor with an adhesive layer therebetween and associating a heating member; and locating a heating member between bosses of the plurality thereof wherein the bosses firmly secure the heating member.

It is still yet another aspect of the present invention to provide an underlayment for association with an in-floor heating element, the underlayment layer comprising a base layer with a first boss and a second boss extending therefrom that are adapted to secure the heating element, the improvement comprising: a hole though the first boss.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
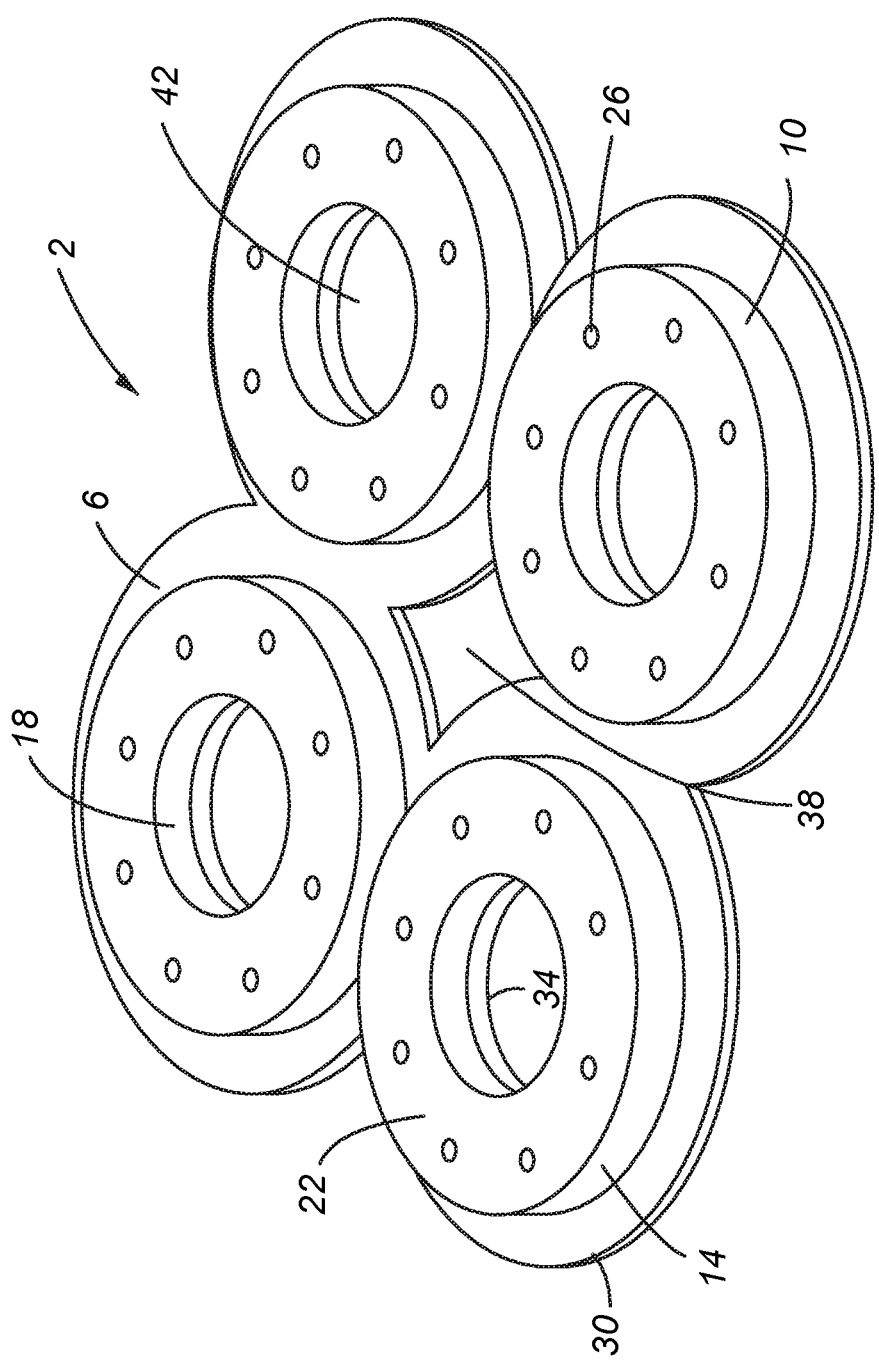
FIG. 1 is a perspective view of an underlayment layer of one embodiment of the present invention.
Figure 2:
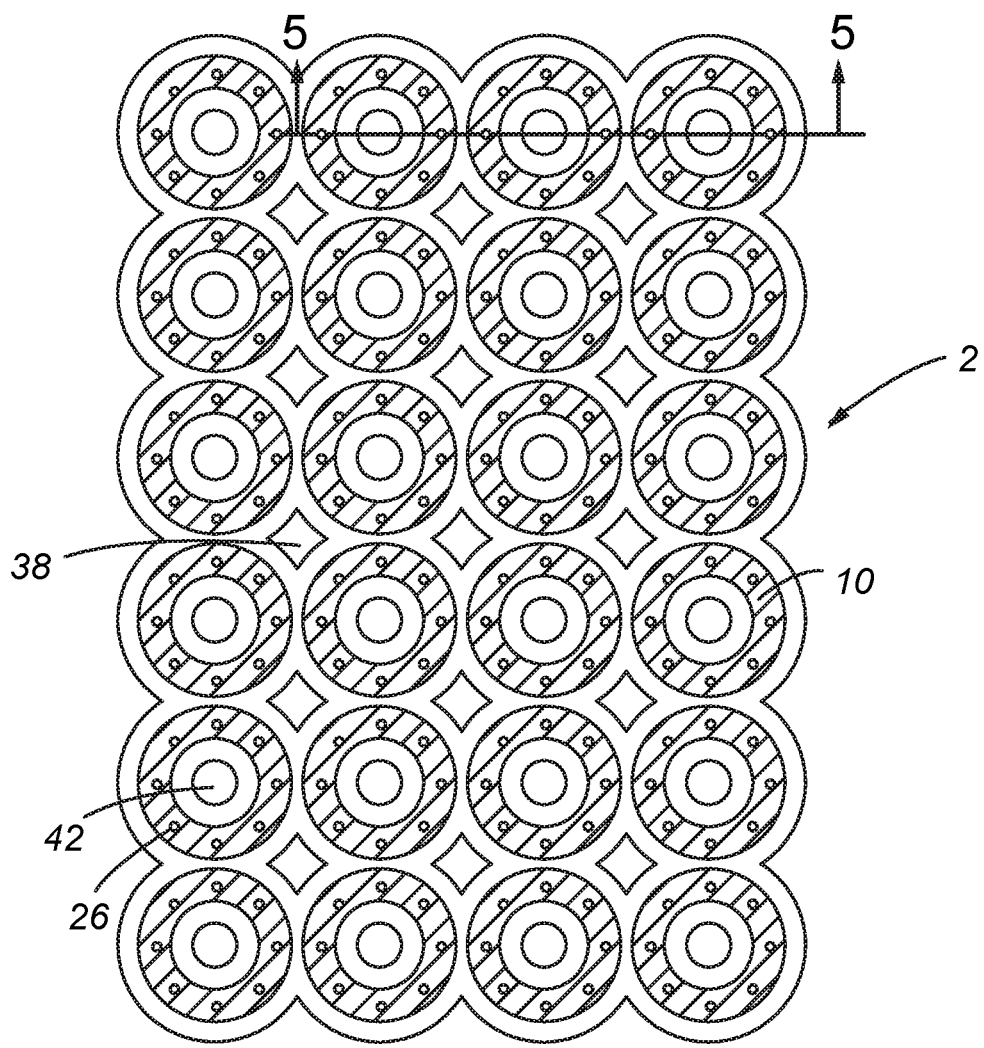
FIG. 2 is a top plan view of FIG. 1.

To assist in the understanding of the present invention the following list of components and associated numbering found in the drawings is provided herein:

| # | Components |
| --- | --- |
| 2 | Underlayment layer |
| 6 | Base |
| 10 | Boss |
| 14 | Outer surface |
| 18 | Inner surface |
| 22 | Upper surface |
| 26 | Hole |
| 30 | Outer diameter |
| 34 | Inner diameter |
| 38 | Opening |
| 42 | Opening |
| 46 | Wire |
| 50 | Flooring system |
| 54 | Sub floor |
| 56 | Adhesive |
| 58 | Channel |
| 60 | Anti-fracture membrane |
| 62 | Adhesive |
| 66 | Flooring member |
| 70 | Grout |
| 74 | Wall |
| 78 | Lip |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-5, an underlayment layer 2 of one embodiment of the present invention is shown that includes a system of interconnected bases 6 and bosses 10. That is, preferably, each base 6 includes a boss 10 extending therefrom. Each boss 10 includes an outer surface 14 and an inner surface 18 and an upper surface 22. In some embodiments the upper surface 22 includes a plurality of holes 26. The bases 6 are generally circular and the bosses 10 are generally cylindrical. The bases 6 also include an outer diameter 30 and inner diameter 34. Again, a plurality of base/boss combinations are interconnected to form the underlayment layer 2.

The bosses 10 of one embodiment of the present invention are between about 1/16 inches wide. The spacing between individual bosses 10 is between about 1 inch to 1.5 inches. One skilled in the art, however, will appreciate that the boss sizes and spacing therebetween may be altered to accommodate different sizes of heating elements. That is, the concepts as shown herein may be freely scalable to accommodate any heating element. The bosses of some embodiments of the present invention extend at least about 3/16 inches from the base. The boss/base combinations are interconnected and include an opening 38 therebetween to help to facilitate bonding and curing of adhesives positioned above and below the underlayment layer 2. The bases may also include an opening 42 position within the inner surface 18 of each boss 10 to facilitate adhesive bonding as well.

Figure 3:
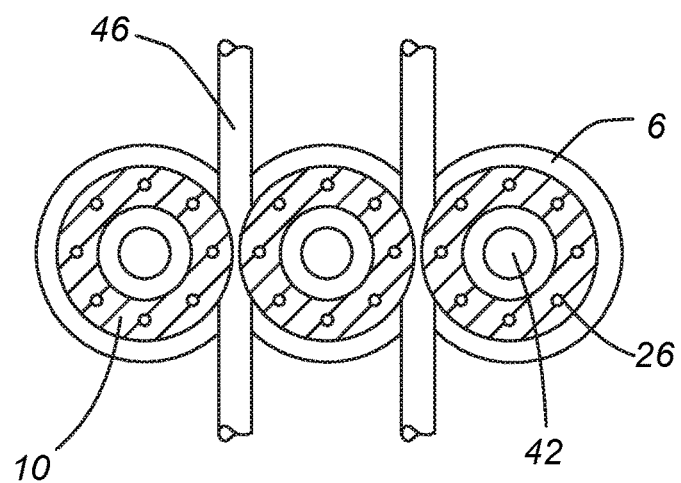
FIG. 3 is a partial top plan view of FIG. 2 showing wires positioned between adjacent bosses.
Figure 4:
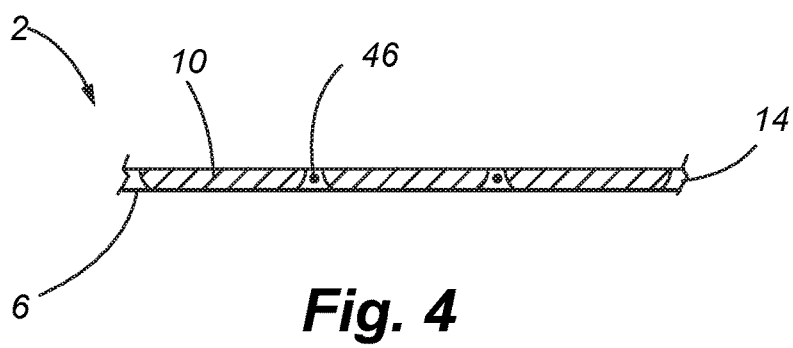
FIG. 4 is a front elevation view of FIG. 3.
Figure 5:
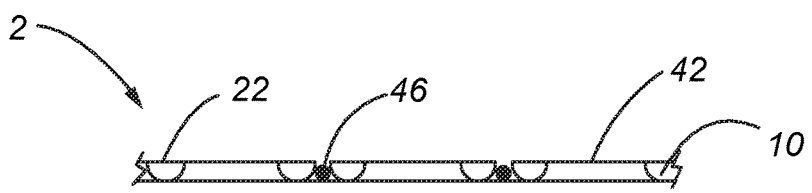
FIG. 5 is a partial cross-sectional view of FIG. 2.

Referring now specifically to FIGS. 3-5, the interaction between a wire 46, i.e. a "heating element" and the bosses 10 is shown. Here, the bosses 10 possess a frustoconical or semispherical outer surface, wherein the diameter of a lower portion of the outer surface 14 is less than the diameter of the upper portion thereof. In some embodiments of the present invention the lower diameter is about 7/8 inches. This configuration allows for the wire 46 to fit snugly between adjacent bosses 10. The wire 46 may be slid between the bosses 10 parallel to the base 6. Preferably, however, the wire 46 is forced downwardly between two bosses 10.

Preferably, the bases 6 and bosses 10 are made of fiber polyethylene, polystyrene or polypropylene and are blow molded, thermally extruded, vacuum and/or pressure formed, and thermally molded. The bosses 10 are of such a material not to deform a temperatures as high as 104 degrees F. and preferably withstand temperatures of about 120 degrees F.

Referring now specifically to FIG. 5, a cross sectional view of a plurality of bosses 10 is shown. Here, the bosses 10 are hollow or at least partially hollow to allow a volume of air to reside therein. The air helps maintain the temperature of the floor as air is an excellent insulator to heat. One of skill in the art will appreciate that the bosses may be filled with any heat conducting or heat insulating material without departing from the scope of the invention. Some embodiments of the present invention include an upper surface 22 having a plurality of holes that provide an entrance into the internal volume of the boss 10. The boss 10 may also include a plurality of holes in the bottom portion thereof to allow for adhesive to communicate through the body of the boss 10.

Figure 6:
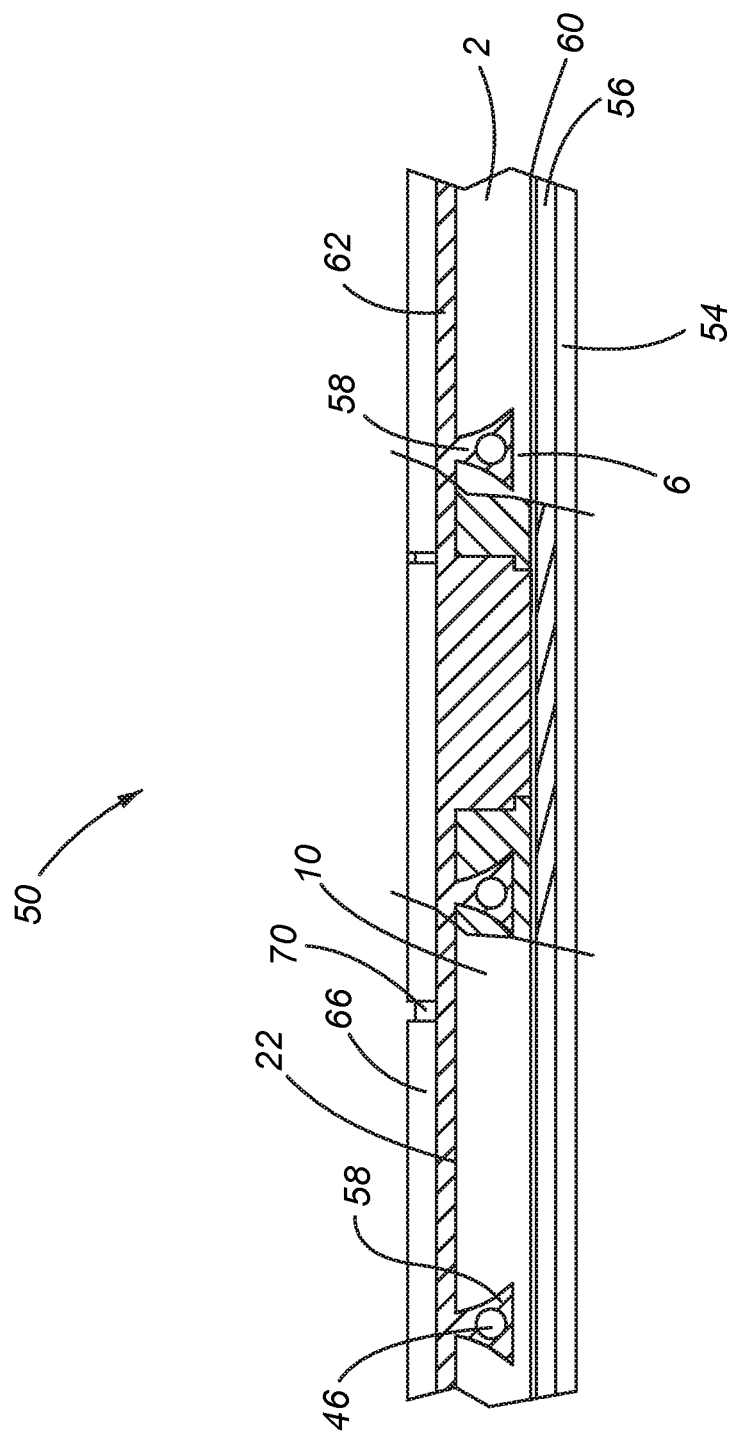
FIG. 6 is a partial cross-sectional view of a flooring system of one embodiment of the present invention.

Referring now to FIG. 6, a cross-sectional view of a flooring system 50 of one embodiment of the present invention is shown. In one embodiment of the present invention, a sub floor 54, for example, plywood, is present with an adhesive 56 applied thereon. The "adhesive" as used herein includes thin set or modified thin set, where thin set is capable of curing in the absence of oxygen or air and modified thin set is incapable of curing in the absence of oxygen or air (e.g., due to the inclusion of polymers in a modified thin set).

The underlayment layer 2 is placed on top of the adhesive 56 and firmly secured thereto, preferably via an anti-fracture membrane 60. More specifically, embodiments of the present invention contemplate providing an anti-fracture membrane (or similar type of membrane or material) in the form of a woven substrate or layer that is removably attached to the underside of the underlayment layer 2 (perhaps by an adhesive or by a lamination-type process whereby the underlayment layer 2 is heated up and the anti-fracture member 60 is pressed there against to create a physical bond between the anti-fracture membrane 60 and the underlayment layer 2).

Some embodiments of the present invention include an underlayment layer 2 with a roughened bottom surface that allows for the adhesive to securely adhere thereto. Other embodiments include an integrated or otherwise associated wire, woven, or plastic mesh, preferably in the form of the anti-fracture membrane 60, to help facilitate the bond between the adhesive 56 and the underlayment layer 2. Although an anti-fracture membrane 60 is described herein as a layer of wire, woven, and/or plastic mesh, one skilled in the art will appreciate that the anti-fracture membrane 60 may include any type of material or combination of materials in any type of format that is capable of facilitating a physical connection between the underlayment layer 2 and the adhesive 56 and/or isolating cracks in the sub floor by displacing mechanical stresses across a broader area of the underlayment layer 2.

A plurality of wires 46 or one wire 46 laid in a serpentine path is placed within the channels 58 between bosses 10. Although one wire 46 is shown positioned between the bosses 10, one skilled in the art will appreciate that a single wire may be placed between bosses 10 in a zig-zag or serpentine configuration. Alternatively, a plurality of wires may be placed on the underlayment layer 2 in a preferred configuration, usually depending upon the desired heating.

After the wires 46 are placed in the predetermined location, another layer of adhesive 62 is applied atop the underlayment layer 2. The second adhesive 62 layer will necessarily fill the spaces between the bosses 10 and will fill the internal space of each boss 10 and interact with the first layer of adhesive 58 to form a cohesive structure. The second adhesive layer 62 may reside over the top surface 22 of the bosses 10 as well or may be flush with the bosses 10. Adhesive 62 is associated with a plurality of flooring members 66, such as tile, stone, brick, pavers, slate, concrete, or wood with grout 70 positioned therebetween.

Figure 7:
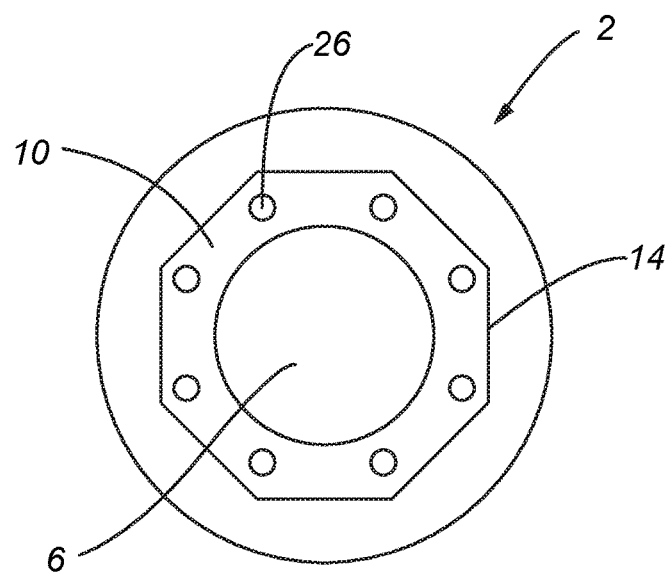
FIG. 7 is a top plan view of a boss and base of another embodiment of the present invention.

Referring now to FIG. 7, a plan view of another embodiment of a boss/base is shown. Here, the boss does not have a smooth outer surface 14 but one that is faceted to engage the wires. The faceted outer surface has the advantage of being easier to mold. Other advantages include crack isolation and/or a more secure retention of heating elements.

Figure 8:
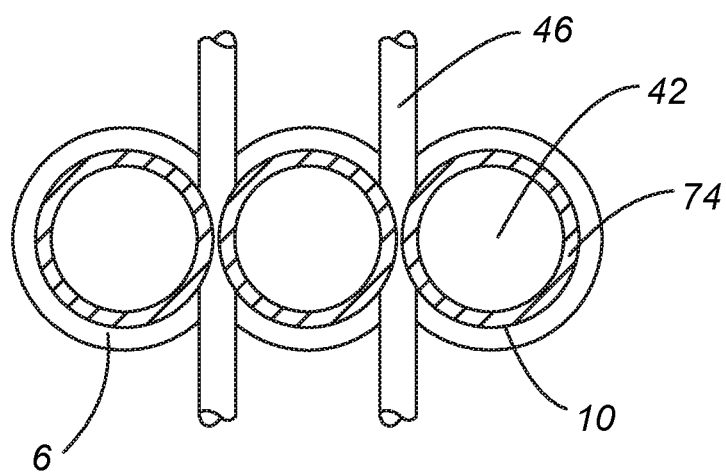
FIG. 8 is a top plan view of a boss and base of another embodiment of the present invention.

Referring now to FIG. 8, another embodiment of the invention is shown that employs a boss 10 generally without an upper surface. This boss 10 is simply an outer wall 74 that engages the wires. The boss may have an opening 42 therethrough to facilitate interaction between subsequent layers of adhesive.

Figure 9:
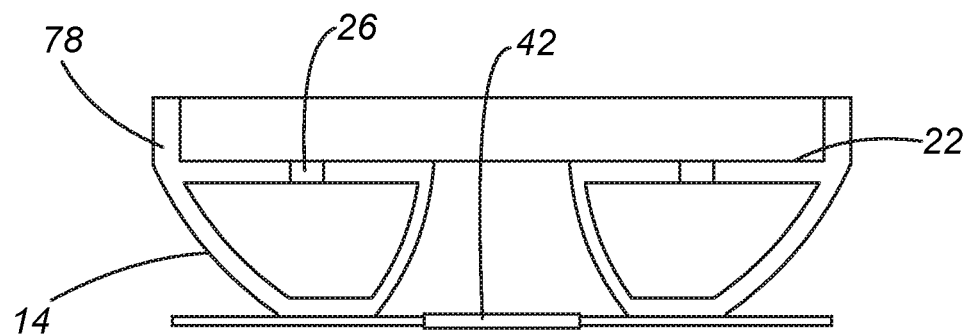
FIG. 9 is a cross-sectional view of a boss and base of another embodiment of the present invention.
Figure 10:
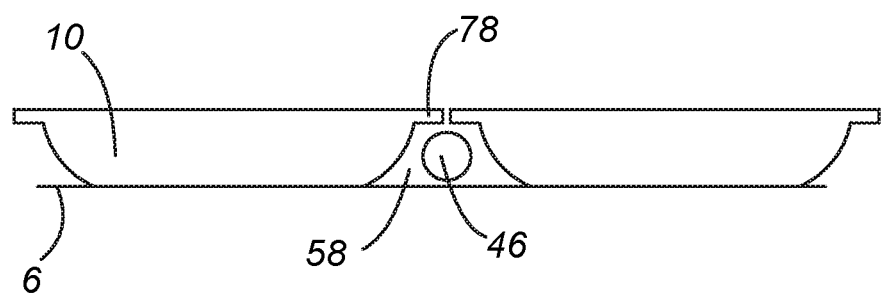
FIG. 10 is a front elevation view of FIG. 9 subsequent to forming thereof.

Referring now to FIGS. 9 and 10, yet another embodiment of the present invention is shown that includes a lip 78. More specifically, these bosses 10 are similar to those shown in FIGS. 1-6 that include openings 42 in the base 6 and the upper surface 22 of the boss 10. As can be appreciated, the outer surface 14 of the boss 10 has a frustoconical or semispherical shape. The lip 78 is associated with the upper surface 22 of the boss and extends upwardly therefrom. Subsequently to forming the boss, the lip 78 is made to protrude gradually from the upper surface 22. The lip 78 is preferably selectively deflectable to help facilitate insertion of a wire 46 between adjacent bosses. The lip 78 then helps maintain the wire 46 between adjacent bosses 10. One skilled in the art will appreciate that the lip 78 may be replaced by at least one tab positioned between adjacent bosses without departing from the scope o the invention.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A radiant-heating system, comprising:
a single base layer;
a first protrusion disposed on the single base layer, the first protrusion comprising a first upper surface connecting a first inner wall and a first outer wall, the first inner wall spaced from the first outer wall, the single base layer extending from the first inner wall;
a second protrusion disposed on the single base layer and adjacent to the first protrusion, the second protrusion comprising a second upper surface connecting a second inner wall and a second outer wall, the second inner wall spaced from the second outer wall, the single base layer extending from the second inner wall; and
a heating element in contact with the single base layer, the first outer wall, and the second outer wall,
wherein each of the first inner wall, the first outer wall, the second inner wall, and the second outer wall is curved in a plane parallel to the single base layer; and
wherein an upper portion of the first protrusion is closer to the second protrusion than a lower portion of the first protrusion.

2. The radiant-heating system of claim 1, wherein the upper portion of the first protrusion comprises an extension that extends in a direction parallel to the single base layer.

3. The radiant-heating system of claim 1, wherein the first protrusion and second protrusion are spaced so as to receive a heating element therebetween.

4. The radiant-heating system of claim 1, wherein the upper portion of the first protrusion is flexibly deflectable.

5. The radiant-heating system of claim 1, wherein the upper surface of at least one of the first protrusion and the second protrusion comprises a plurality of holes.

6. The radiant-heating system of claim 1, wherein the first upper surface is directly bonded to a flooring surface with thin set.

7. The radiant-heating system of claim 1, wherein the single base layer comprises a plurality of holes therein.

8. The radiant-heating system of claim 1, wherein the single base layer, the first protrusion, and the second protrusion are integrally formed, and further wherein the single base layer comprises an undersurface attached to an anti-fracture membrane.

9. The radiant-heating system of claim 8, wherein the anti-fracture membrane is physically bonded to the single base layer.

10. The radiant-heating system of claim 1, wherein the first protrusion and second protrusion are both ring shaped with a uniform height.

11. A floor underlayment, comprising:
a base layer having a plurality of holes therein;
a plurality of rows of bosses rising from the base layer, each boss comprising:
an outer wall spaced from an inner wall, each of the outer wall and the inner wall being curved in a plane parallel to the base layer, the base layer extending from the inner wall; and
an upper surface connecting the outer wall to the inner wall;
a corridor between each of the bosses in the plurality of rows of bosses, the corridor having a first width near the base layer and a second width above the base layer, wherein the first width is greater than the second width; and
a heating element in contact with the base layer and the outer wall of a plurality of bosses.

12. The floor underlayment of claim 11, wherein a heating wire is disposed in at least one corridor.

13. The floor underlayment of claim 11, wherein the base layer comprises an undersurface attached to an anti-fracture membrane.

14. The floor underlayment of claim 13, wherein the anti-fracture membrane is physically bonded to the base layer.

15. The floor underlayment of claim 11, wherein the upper surface is directly bonded to a flooring surface with thin set.

16. A system for securing an in-floor heating element, the system comprising:

an anti-fracture membrane;

a base layer having a plurality of holes therein, the base layer comprising an upper surface and a lower surface, the lower surface attached to the anti-fracture membrane;

a plurality of bosses protruding out of the upper surface away from the anti-fracture membrane, the plurality of bosses arranged in a matrix across the upper surface, each boss having an outer wall spaced from an inner wall, each of the outer wall and the inner wall being curved in a plane parallel to the base layer, the base layer extending from the inner wall; and a heating element in contact with the base layer and the outer wall of at least two of the plurality of bosses.

17. The system of claim 16, wherein the anti-fracture membrane is woven.

18. The system of claim 16, wherein the anti-fracture membrane is physically bonded to the lower surface.

19. The system of claim 16, wherein the anti-fracture membrane is removably attached to the lower surface.

20. The system of claim 16, wherein the upper surface is directly bonded to a flooring surface with thin set.

\* \* \* \* \*